United States Patent
Kosuge et al.

(10) Patent No.: US 9,518,543 B2
(45) Date of Patent: Dec. 13, 2016

(54) FUEL SUPPLY SYSTEM AND FUEL SUPPLY METHOD FOR INTERNAL COMBUSTION ENGINE

(75) Inventors: Hideaki Kosuge, Okazaki (JP); Susumu Kojima, Susono (JP); Rio Shimizu, Mishima (JP); Tomojiro Sugimoto, Susono (JP); Masayuki Akita, Ama (JP); Jin Tanaka, Kariya (JP); Makoto Nakagawa, Obu (JP); Masaki Ikeya, Obu (JP)

(73) Assignees: TOYOTA JIDOSHA KABUSHIKI KAISHA, Toyota (JP); NIPPON SOKEN, INC., Aichi (JP); AISAN KOGYO KABUSHIKI KAISHA, Obu-shi (JP)

( * ) Notice: Subject to any disclaimer, the term of this patent is extended or adjusted under 35 U.S.C. 154(b) by 470 days.

(21) Appl. No.: 14/123,391

(22) PCT Filed: May 31, 2012

(86) PCT No.: PCT/IB2012/001060
§ 371 (c)(1),
(2), (4) Date: Jan. 8, 2014

(87) PCT Pub. No.: WO2012/168776
PCT Pub. Date: Dec. 13, 2012

(65) Prior Publication Data
US 2014/0116394 A1 May 1, 2014

(30) Foreign Application Priority Data

Jun. 7, 2011 (JP) .................... 2011-127562

(51) Int. Cl.
*F02M 21/02* (2006.01)
*F02M 53/02* (2006.01)
(Continued)

(52) U.S. Cl.
CPC .............. *F02M 53/02* (2013.01); *F02D 19/02* (2013.01); *F02D 19/022* (2013.01);
(Continued)

(58) Field of Classification Search
CPC ...... F02M 3/02; F02M 21/06; F02M 21/0212; F02D 19/02; F02D 19/022; F02D 41/0027; Y02T 10/32
(Continued)

(56) References Cited

U.S. PATENT DOCUMENTS 4,545,356 A * 10/1985 Casey ..................... F02B 43/00
123/1 A
4,742,801 A * 5/1988 Kelgard ................... F02B 3/00
123/27 GE (Continued)

FOREIGN PATENT DOCUMENTS

JP S60227099 A 11/1985
JP H06-174194 A 6/1994
(Continued)

OTHER PUBLICATIONS

Dec. 24, 2014 Office Action issued in Japanese Application No. 2011-127562.

*Primary Examiner* — Hung Q Nguyen
(74) *Attorney, Agent, or Firm* — Oliff PLC

(57) ABSTRACT

A fuel supply system for an internal combustion engine includes a heat exchanger that has a heat exchanging wall between a liquefied fuel passage and an engine coolant passage. Heated and vaporized fuel flowing out from the liquefied fuel passage of the heat exchanger is supplied to the internal combustion engine. A flow rate of liquefied fuel supplied to the liquefied fuel passage of the heat exchanger is set. A flow rate of engine coolant supplied to the engine coolant passage of the heat exchanger is determined on the (Continued)

basis of a temperature of the engine coolant supplied to the engine coolant passage of the heat exchanger such that nucleate boiling or transition boiling of the liquefied fuel in the set flow rate occurs near a boundary between nucleate boiling and transition boiling in the liquefied fuel passage.

1 Claim, 2 Drawing Sheets

(51) Int. Cl.
  *F02M 21/06* (2006.01)
  *F02D 19/02* (2006.01)
  *F02D 41/00* (2006.01)

(52) U.S. Cl.
  CPC ..... *F02D 41/0027* (2013.01); *F02M 21/0212* (2013.01); *F02M 21/06* (2013.01); *Y02T 10/32* (2013.01)

(58) Field of Classification Search
  USPC .......................................... 123/525, 526, 527
  See application file for complete search history.

(56) References Cited

U.S. PATENT DOCUMENTS

| | | | | |
|---|---|---|---|---|
| 5,314,007 A | * | 5/1994 | Christenson | B60H 1/3202 123/557 |
| 5,343,847 A | * | 9/1994 | Chasteen | F02D 21/02 123/468 |
| 6,044,825 A | * | 4/2000 | Carter | F02M 21/06 123/557 |
| 2004/0144370 A1 | * | 7/2004 | Mey | F02M 21/06 123/527 |
| 2006/0027216 A1 | | 2/2006 | Hayashi et al. | |
| 2006/0054145 A1 | | 3/2006 | Hayashi et al. | |

FOREIGN PATENT DOCUMENTS

| | | |
|---|---|---|
| JP | H08-93570 A | 4/1996 |
| JP | A-09-113168 | 5/1997 |
| JP | 2006017058 A | 1/2006 |
| JP | 2007-231757 A | 9/2007 |
| JP | A-2008-121645 | 5/2008 |
| WO | WO 02/090750 A1 | 11/2002 |
| WO | WO 2007/106930 A1 | 9/2007 |

\* cited by examiner

# FUEL SUPPLY SYSTEM AND FUEL SUPPLY METHOD FOR INTERNAL COMBUSTION ENGINE

BACKGROUND OF THE INVENTION

1. Field of the Invention

The invention relates to a fuel supply system and fuel supply method for an internal combustion engine, which vaporize liquefied fuel and supply the liquefied fuel to the internal combustion engine.

2. Description of Related Art

It is generally known that fuel that is gaseous at ordinary temperatures and pressures, such as LPG, is used as fuel for an internal combustion engine. Such gaseous fuel is cooled to be liquefied and is stored in a fuel tank. Liquefied fuel in the fuel tank is heated to be vaporized and is supplied into a cylinder of the internal combustion engine. Heat of engine coolant is generally utilized to heat and vaporize liquefied fuel; however, a fuel supply system that utilizes heat of an electric heater when the temperature of the engine coolant is low is suggested (see Japanese Patent Application Publication No. 2008-121645 (JP 2008-121645 A)).

The above described fuel supply system is configured to heat and vaporize liquefied fuel by exchanging heat between the engine coolant and the liquefied fuel when the temperature of the engine coolant is higher than or equal to a set temperature. However, when the temperature of the engine coolant is relatively high, a heat flux from the engine coolant to the liquefied fuel decreases and, therefore, the liquefied fuel may not be sufficiently vaporized.

The invention provides a fuel supply system and fuel supply method for an internal combustion engine, which suppress a decrease in heat flux from engine coolant to liquefied fuel in a heat exchanger to thereby make it possible to appropriately vaporize the liquefied fuel in a fuel tank utilizing heat of the engine coolant and to supply the vaporized fuel into a cylinder.

A first aspect of the invention provides a fuel supply system for an internal combustion engine, which supplies heated and vaporized fuel to the internal combustion engine. The fuel supply system includes a heat exchanger that has a heat exchanging wall between a liquefied fuel passage and an engine coolant passage, wherein the heated and vaporized fuel flows out from the liquefied fuel passage of the heat exchanger, a flow rate of liquefied fuel supplied to the liquefied fuel passage of the heat exchanger is set, and a flow rate of engine coolant supplied to the engine coolant passage of the heat exchanger is determined on the basis of a temperature of the engine coolant supplied to the engine coolant passage of the heat exchanger such that nucleate boiling or transition boiling of the liquefied fuel in the set flow rate occurs near a boundary between nucleate boiling and transition boiling in the liquefied fuel passage.

With the fuel supply system according to the above aspect, the fuel supply system includes the heat exchanger that has the heat exchanging wall between the liquefied fuel passage and the engine coolant passage, heated and vaporized fuel flowing out from the liquefied fuel passage of the heat exchanger is supplied to the internal combustion engine, the flow rate of liquefied fuel supplied to the liquefied fuel passage of the heat exchanger is set, and the flow rate of engine coolant supplied to the engine coolant passage of the heat exchanger is determined on the basis of the temperature of the engine coolant supplied to the engine coolant passage of the heat exchanger such that nucleate boiling or transition boiling of the liquefied fuel in the set flow rate occurs near the boundary between nucleate boiling and transition boiling in the liquefied fuel passage. In this way, when nucleate boiling or transition boiling of the liquefied fuel occurs near the boundary between nucleate boiling and transition boiling in the liquefied fuel passage of the heat exchanger, the liquefied fuel may obtain a heat flux near local maximum from the engine coolant, so the liquefied fuel may be appropriately vaporized and is supplied to the internal combustion engine.

A second aspect of the invention relates to a fuel supply method for an internal combustion engine, which supplies heated and vaporized fuel to the internal combustion engine. The fuel supply method includes: providing a heat exchanger that has a heat exchanging wall between a liquefied fuel passage and an engine coolant passage, wherein the heated and vaporized fuel flows out from the liquefied fuel passage of the heat exchanger; setting a flow rate of liquefied fuel supplied to the liquefied fuel passage of the heat exchanger; and determining a flow rate of engine coolant supplied to the engine coolant passage of the heat exchanger on the basis of a temperature of the engine coolant supplied to the engine coolant passage of the heat exchanger such that nucleate boiling or transition boiling of the liquefied fuel in the set flow rate occurs near a boundary between nucleate boiling and transition boiling in the liquefied fuel passage.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
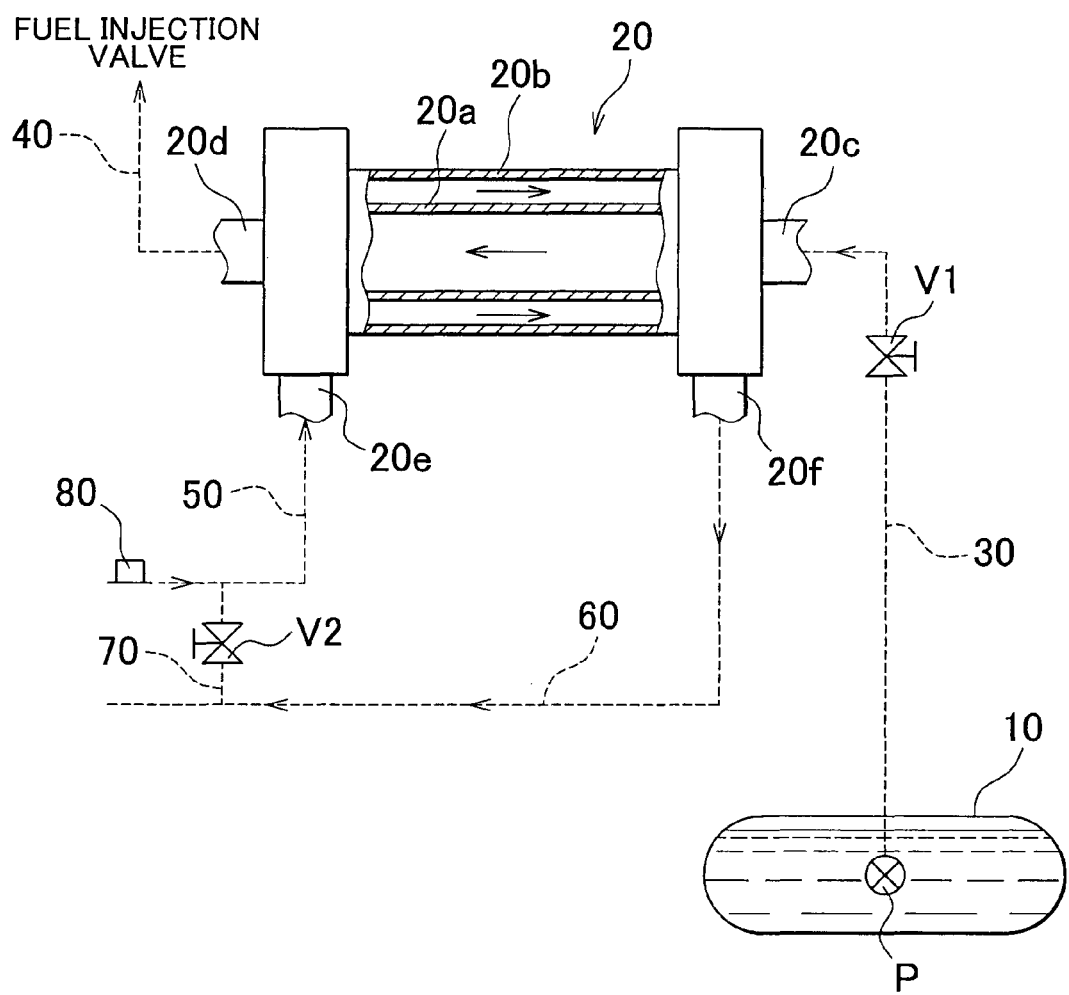
FIG. 1 is a schematic view that shows a fuel supply system for an internal combustion engine according to an embodiment of the invention.

FIG. 1 is a schematic view that shows a fuel supply system for an internal combustion engine according to an embodiment of the invention. Control over the members of the fuel supply system described below is executed by an electronic control unit (not shown). In the drawing, the reference numeral 10 denotes a fuel tank, and the fuel tank 10 stores LPG that mainly contains propane (that has a boiling point of −42.09° C.) and butane (that has a boiling point of −0.5° C.). Of course, liquefied fuel intended by the fuel supply system according to the aspect of the invention is not limited to LPG, but it may be any gaseous combustible material at ordinary temperatures and pressures. For example, the liquefied fuel may be a combustible material having a boiling point nearly equal to that of propane, a combustible material having a boiling point nearly equal to that of butane, and a combustible material having a boiling point between the boiling point of propane and the boiling point of butane.

The reference numeral 20 denotes a heat exchanger that is used to vaporize liquefied fuel in the fuel tank 10. The heat exchanger 20 includes an internal pipe 20a and an external pipe 20b. The internal pipe 20a functions as a liquefied fuel passage. The external pipe 20b functions as an engine coolant passage. In this way, the pipe wall of the internal pipe 20a functions as a heat exchanging wall between liquefied fuel and engine coolant. A fuel introducing passage 30 is connected to the inlet portion 20c of the internal pipe 20a. The fuel introducing passage 30 is used to supply liquefied fuel stored in the fuel tank 10. A fuel delivery passage 40 is connected to the outlet portion 20d of the internal pipe 20a. The fuel delivery passage 40 is used to supply vaporized fuel to the fuel injection valve of each cylinder directly or via an accumulator common to the cylinders.

In addition, a coolant introducing passage 50 is connected to the inlet portion 20e of the external pipe 20b. The coolant introducing passage 50 is used to supply engine coolant that is heated in a coolant passage in a cylinder block (not shown) and that is yet to be cooled by a radiator (not shown). A coolant delivery passage 60 is connected to the outlet portion 20f of the external pipe 20b. The coolant delivery passage 60 is used to return engine coolant, flowing out from the external pipe 20b, to the radiator (or the coolant passage of the cylinder block). A coolant pump is provided in the coolant introducing passage 50 where necessary.

A fuel pump P is provided inside the fuel tank 10. The fuel pump P is used to pump liquefied fuel to the fuel introducing passage 30. A fuel metering valve V1 is provided in the fuel introducing passage 30. The fuel metering valve V1 meters the flow rate of liquefied fuel pumped by the fuel pump P and supplies the liquefied fuel to the internal pipe 20a of the heat exchanger 20. In addition, a fluid communication passage 70 is formed so as to provide fluid communication between the coolant introducing passage 50 and the coolant delivery passage 60. A coolant metering valve V2 is provided in the fluid communication passage 70. The flow rate of engine coolant that passes through the fluid communication passage 70 and that bypasses the external pipe 20b of the heat exchanger 20 is metered by the coolant metering valve V2 to thereby make it possible to control the flow rate of engine coolant that passes through the external pipe 20b. The reference numeral 80 denotes a temperature sensor. The temperature sensor 80 is used to measure the temperature of coolant in the coolant introducing passage 50.

In the thus configured fuel supply system according to the present embodiment, heat is exchanged between liquefied fuel that passes through the internal pipe 20a, which functions as the liquefied fuel passage, as indicated by the arrow and engine coolant that passes through the passage between the external pipe 20b and the internal pipe 20a, which functions, as the engine coolant passage, as indicated by the arrow to thereby boil the liquefied fuel in the internal pipe 20a, and the pipe wall inner surface of the internal pipe 20a serves as a heat transmitting surface that transfers heat of engine coolant, passing on the outer side of the internal pipe 20a, to liquefied fuel.

Figure 2:
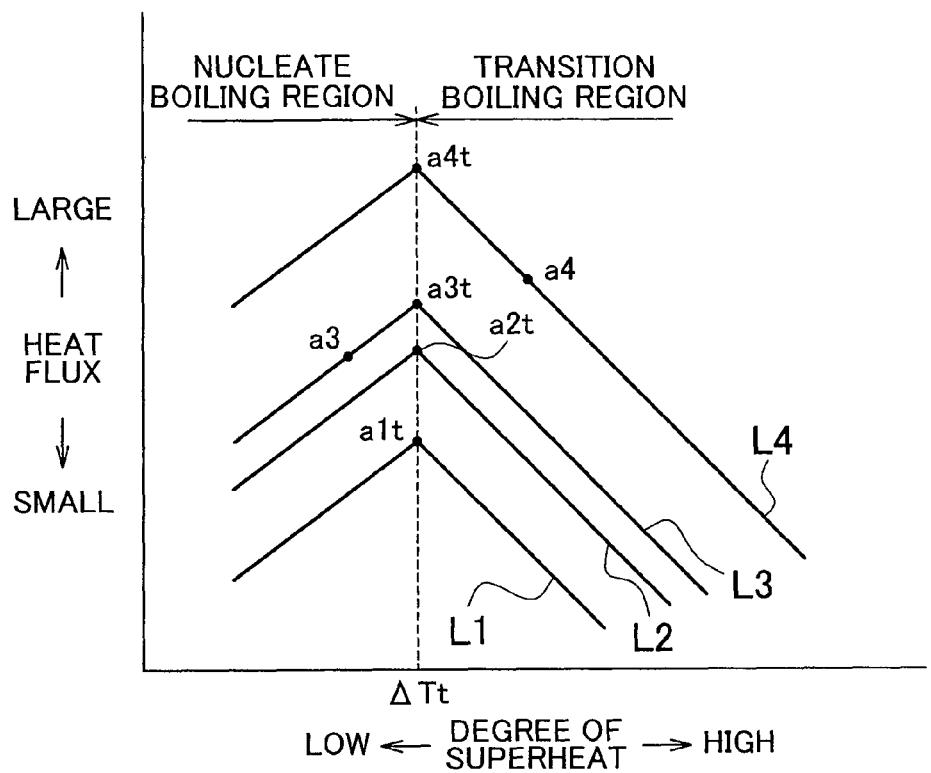
FIG. 2 is a graph that shows the correlation between a degree of superheat and a heat flux when liquefied fuel is boiled.

FIG. 2 is a graph that shows the correlation between a degree of superheat and a heat flux when specific liquefied fuel is boiled in the internal pipe 20a of the heat exchanger. Here, a degree of superheat is the difference between the temperature of the pipe wall inner surface of the internal pipe 20a, that is, the heat transmitting surface, and the boiling point of liquefied fuel, and a heat flux is an amount of heat transferred from the heat transmitting surface in unit area to liquefied fuel per unit time. As shown in FIG. 2, there is a graph that shows the correlation between a degree of superheat and a heat flux for specific liquefied fuel for each combination of the temperature and flow rate of engine coolant that passes on the outer side of the internal pipe 20a, and, as the temperature of engine coolant increases, a heat flux with respect to the same degree of superheat increases; whereas, as the flow rate of engine coolant increases, a heat flux with respect to the same degree of superheat increases. That is, in order of the graphs L1, L2, L3 and L4, the flow rate of engine coolant increases or the temperature of engine coolant increases.

In this way, there are a multiple number of graphs that show the correlation between a degree of superheat and a heat flux for a specific liquefied fuel, and, as shown in FIG. 2, a heat flux becomes a local maximum against a substantially constant boundary degree of superheat $\Delta Tt$. The region in which a degree of superheat is lower than the boundary degree of superheat $\Delta Tt$ is a nucleate boiling region in which liquefied fuel boils in nucleate boiling by which vapor bubbles are produced from a specific point of the heat transmitting surface. The region in which a degree of superheat is higher than the boundary degree of superheat $\Delta Tt$ is a transition boiling region in which liquefied fuel boils in transition boiling by which vapor bubbles from the specific point of the heat transmitting surface are connected to partially form a vapor film on the heat transmitting surface.

In addition, in each graph, as the flow rate of liquefied fuel that passes through the internal pipe 20a increases, the temperature of the pipe wall inner surface of the internal pipe 20a, that is, the temperature of the heat transmitting surface, decreases, so a degree of superheat decreases. For example, in the graph L4 of the combination of a specific flow rate and specific temperature of engine coolant supplied to the heat exchanger 20, the flow rate of liquefied fuel supplied to the heat exchanger 20 at point a4, at which a degree of superheat is higher than the boundary degree of superheat $\Delta Tt$, is smaller/than the flow rate of liquefied fuel supplied to the heat exchanger 20 at point a4t at which the boundary degree of superheat $\Delta Tt$ is achieved; however, only a heat flux smaller than that of liquefied fuel in the flow rate at point a4t is given to liquefied fuel in the flow rate at point a4, and liquefied fuel does not appropriately boil at point a4 having a degree of superheat higher than the boundary degree of superheat $\Delta Tt$. Therefore, in order to appropriately vaporize liquefied fuel in the flow rate at point a4, it is only necessary that the flow rate of engine coolant is reduced against the temperature of engine coolant at this time to achieve the boundary degree of superheat $\Delta Tt$ with engine coolant having the same temperature against liquefied fuel in the same flow rate.

In addition, for example, in the graph L3 of the combination of another specific flow rate and another specific temperature of engine coolant supplied to the heat exchanger 20, the flow rate of liquefied fuel supplied to the heat exchanger 20 at point a3, at which a degree of superheat is lower than the boundary degree of superheat $\Delta Tt$, is larger than the flow rate of liquefied fuel supplied to the heat exchanger 20 at point a3t at which the boundary degree of superheat $\Delta Tt$ is achieved. In this case, only a heat flux smaller than that of liquefied fuel in the flow rate at point a3t is given to liquefied fuel in the flow rate at point a3, so liquefied fuel dose not appropriately boil at point a3. Therefore, in order to appropriately vaporize liquefied fuel in the flow rate at point a3, where possible, it is only necessary that the flow rate of engine coolant is increased against the temperature of engine coolant at this time to achieve the boundary degree of superheat $\Delta Tt$ with engine coolant having the same temperature against liquefied fuel in the same flow rate. As a heat flux against the same degree of superheat increases, that is, in order of the graphs L1, L2, L3 and L4, the flow rate of liquefied fuel supplied to the heat exchanger 20 at the time when the boundary degree of superheat ΔTt is achieved and a local maximum heat flux is given to liquefied fuel (at points a1t, a2t, a3t and a4t) increases.

Figure 3:
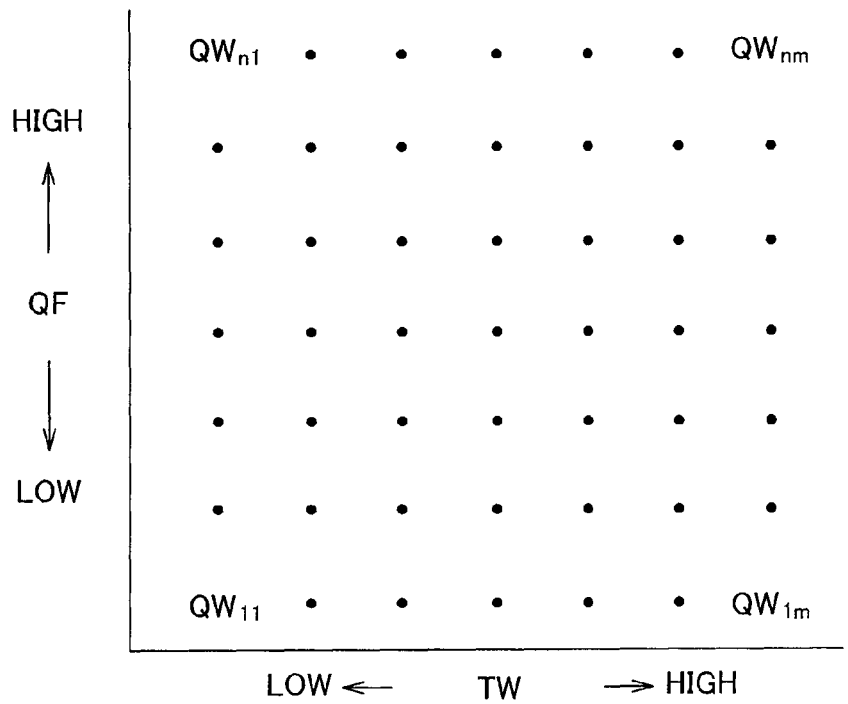
FIG. 3 is a map that shows the flow rate of engine coolant determined on the basis of the flow rate of liquefied fuel and the temperature of engine coolant.

In this way, a map for determining the flow rate QW of engine coolant may be set as shown in FIG. 3 on the basis of the flow rate QF of liquefied fuel and the temperature TW of engine coolant such that there is a combination of the flow rate QW and temperature TW of engine coolant supplied to the heat exchanger 20 at the time when the boundary degree of superheat ΔTt is achieved and the flow rate QF of liquefied fuel supplied to the heat exchanger 20 and the boundary degree of superheat ΔTt is substantially achieved to give a substantially local maximum heat flux to liquefied fuel.

Therefore, in order to achieve the fuel injection amount of each cylinder, required of a current engine operating state based on an engine load and an engine rotation speed, when the flow rate QF of liquefied fuel supplied to the liquefied fuel passage, that is, the internal pipe 20a, of the heat exchanger 20 is set, the flow rate QW of engine coolant supplied to the engine coolant passage of the heat exchanger 20 may be determined from the map of FIG. 3 on the basis of the temperature TW of engine coolant supplied to the engine coolant passage, that is, the external pipe 20b, of the heat exchanger 20 such that nucleate boiling or transition boiling of liquefied fuel in the thus set flow rate occurs near the boundary between nucleate boiling and transition boiling in the liquefied fuel passage.

The set flow rate QF of liquefied fuel may be achieved by controlling the fuel metering valve V1, and the determined flow rate QW of engine coolant may be achieved by controlling the coolant metering valve V2. The temperature TW of engine coolant supplied to the heat exchanger 20 may be detected by the temperature sensor 80. Instead, the temperature TW of engine coolant may be estimated on the basis of the engine operating state.

In this way, when nucleate boiling or transition boiling of liquefied fuel occurs near the boundary between nucleate boiling and transition boiling in the liquefied fuel passage of the heat exchanger 20, the liquefied fuel may obtain a heat flux near local maximum from the engine coolant, so liquefied fuel may be appropriately vaporized and is then supplied to the internal combustion engine.

Particularly, in the map of FIG. 3, when the temperature of engine coolant TW is lower than a set temperature and the flow rate QF of liquefied fuel is larger than a set flow rate, the flow rate may be set such that Reynolds' number of engine coolant that passes through the external pipe 20b of the heat exchanger 20 is larger than or equal to 2000 to place engine coolant in turbulent flow to thereby facilitate heat transfer from the engine coolant to the internal pipe 20a and increase a heat flux transferred from the inner surface of the internal pipe 20a to liquefied fuel.

The heat exchanger 20 is not limited to a double tube shape shown in FIG. 1, but the heat exchanger 20 may be formed in any shape. Of course, the map shown in FIG. 3 varies among heat exchangers having different sizes, shapes and materials, and, in addition, varies among fuels having different boiling points and heats of vaporization. For example, when LPG is used as fuel, it is desirable that the map shown in FIG. 3 is set for each mixture ratio of propane and butane and these maps are selectively used for each mixture ratio by, for example, detecting the mixture ratio.

The invention claimed is:

1. A fuel supply method for an internal combustion engine, which supplies heated and vaporized fuel to the internal combustion engine, comprising:
providing a heat exchanger that has a heat exchanging wall between a liquefied fuel passage and an engine coolant passage, wherein the heated and vaporized fuel flows out from the liquefied fuel passage of the heat exchanger;
setting a flow rate of liquefied fuel supplied to the liquefied fuel passage of the heat exchanger, and
determining a flow rate of engine coolant supplied to the engine coolant passage of the heat exchanger on the basis of a temperature of the engine coolant supplied to the engine coolant passage of the heat exchanger such that nucleate boiling or transition boiling of the liquefied fuel in a set flow rate occurs near a boundary between nucleate boiling and transition boiling in the liquefied fuel passage.

* * * * *